United States Patent [19]

Bolon et al.

[11] 4,388,371
[45] Jun. 14, 1983

[54] SELF-BONDING ACRYLIC POLYMER OVERCOAT FOR COATED METAL SUBSTRATES

[75] Inventors: Donald A. Bolon, Scotia, N.Y.; Edith M. Boldebuck, (deceased), late of Downers Grove, Ill., by Jeanette M. Foster, executrix

[73] Assignee: General Electric Company, Fort Wayne, Ind.

[21] Appl. No.: 278,203

[22] Filed: Jun. 29, 1981

[51] Int. Cl.³ .................. B32B 27/30; H01F 41/06
[52] U.S. Cl. ................................. 428/383; 29/596; 29/605; 174/120 SR; 156/169; 156/307.1; 427/118; 428/463
[58] Field of Search ............... 428/383, 380, 379, 463; 174/120 SR, 110 SR; 310/179; 156/307.1, 307.5, 169, 172, 173, 175, 331.2, 332; 29/605, 596; 427/118, 120

[56] References Cited

U.S. PATENT DOCUMENTS

| | | |
|---|---|---|
| T904,006 | 11/1972 | Mell ................................. 428/383 |
| 2,787,603 | 4/1957 | Sanders . |
| 2,916,403 | 12/1959 | Calderwood . |
| 3,300,843 | 1/1967 | Umewaka et al. . |
| 3,456,338 | 7/1969 | Mohrman et al. . |
| 3,516,858 | 6/1970 | Fitzhugh et al. . |
| 3,574,015 | 4/1971 | Blee . |
| 3,676,814 | 7/1972 | Trunzo et al. . |
| 3,974,016 | 8/1976 | Bondybey et al. . |
| 4,159,364 | 6/1979 | Craig . |
| 4,231,151 | 11/1980 | Haderen ................................. 427/118 |
| 4,273,829 | 6/1981 | Perreault ................................. 428/383 |
| 4,291,457 | 9/1981 | Heyraud . |
| 4,346,136 | 8/1982 | Lupinski ................................. 427/120 |

OTHER PUBLICATIONS

Ferne, "Improvement of Winding Techniques by Use of Thermoplastic and Thermosetting Selfbonding Wires," undated.

Noguchi et al., "Bonding Characteristics of Class F High-Bond Enameled Wires," undated.

Primary Examiner—Michael W. Ball
Attorney, Agent, or Firm—Ralph E. Krisher, Jr.

[57] ABSTRACT

An insulated heat bondable electrically conductive material includes an electrically conductive substrate, a base coat on the substrate of electrically insulating, heat resistant, cured resin, and an overcoat of heat curable acrylic polymer upon the base coat forming a heat bondable acrylic polymer coating thereon.

The disclosure also includes: an insulated heat bondable magnet wire; a bondable enamel coated, insulated electrical conductor; an article; a dynamoelectric machine; a method of making an insulated, heat bondable metal substrate; and, a method of self-bonding a plurality of turns of a magnet wire.

28 Claims, 6 Drawing Figures

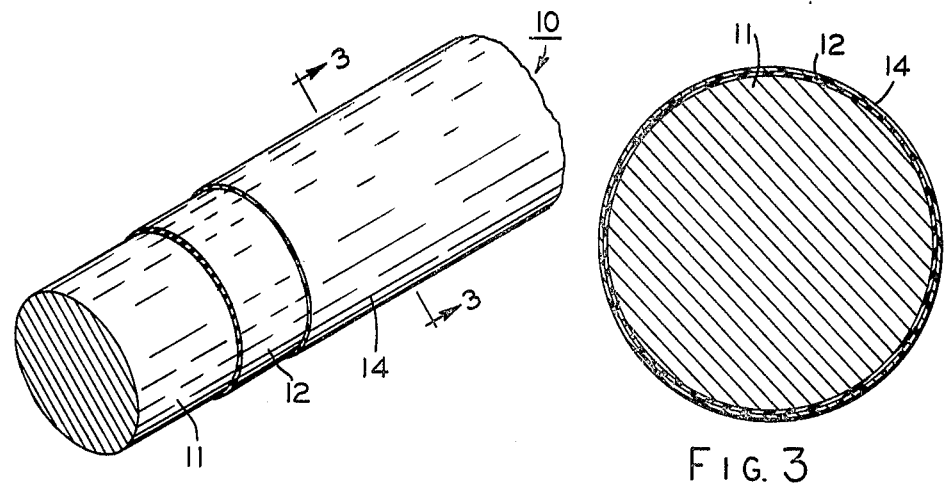
FIG. 2
FIG. 3
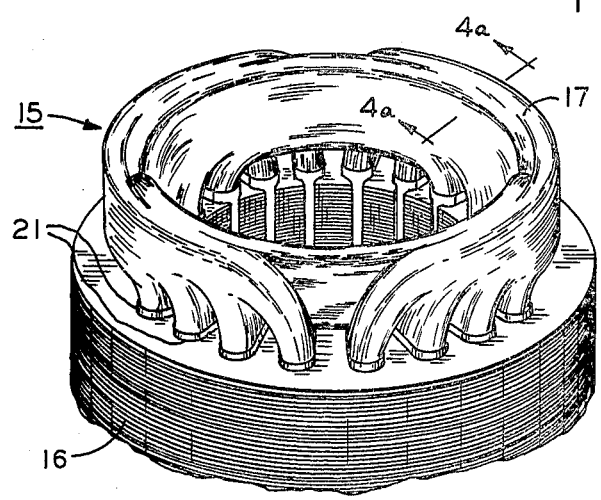
FIG. 4
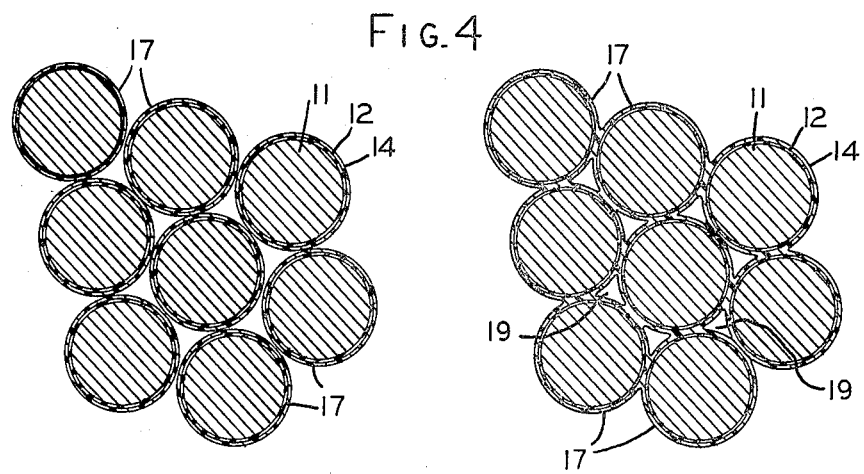
FIG. 4a
FIG. 4b

SELF-BONDING ACRYLIC POLYMER OVERCOAT FOR COATED METAL SUBSTRATES

BACKGROUND OF THE INVENTION

1. Field of the Invention

The present invention relates to self-bondable, electrically insulated, conductive substrates, and more particularly, the invention relates to bondable, electrically insulating heat curable coating compositions. More specifically, this invention is directed to an improved self-bondable magnet wire.

2. Description of the Prior Art

Adhesive varnishes and coatings have long been known in the art to be useful for providing self-bonding laminae and magnet wire. Self-bonding magnet wire, for example, can be wound into coils, which are then heated either externally or by internal resistance, to cause the bonding coating to fuse or thermally set to form rigid bonded coil structures. Laminates can be similarly formed. Among such self-bonding adhesive coating materials are certain polysulfones as disclosed in U.S. Pat. No. 3,676,814, issued July 11, 1972 to F. F. Trunzo et al. for HIGH TEMPERATURE ADHESIVE OVERCOAT FOR MAGNET WIRE; vinyls such as polyvinyl chloride or polyvinyl acetate as disclosed in U.S. Pat. No. 3,574,015, issued Apr. 6, 1971, to J. C. Blee for METHOD AND APPARATUS FOR JOINING CONDUCTORS; polyethylene, as disclosed in U.S. Pat. No. 3,974,016, issued Aug. 10, 1976 to V. E. Bondybey et al. for BONDING OF THERMOPLASTIC COATED CYLINDERS; polyvinyl acetals such as polyvinyl butyral as disclosed in U.S. Pat. No. 3,516,858, issued June 23, 1970, to A. F. Fitzhugh et al., for SELF-BONDING MAGNET WIRE AND PROCESS FOR PREPARING THE SAME; U.S. Pat. No. 3,300,843, issued Jan. 31, 1967, to T. Umewaka et al., for SELF-BONDING MAGNET WIRE AND METHOD; and U.S. Pat. No. 3,456,338, issued July 22, 1969, to D. W. Mohrman et al., for METHOD FOR CHANGING THE CONFIGURATION OF AND FOR BONDING ELECTRICAL COILS OF INDUCTIVE DEVICES; polyamide-imide enamel with residual solvent as disclosed in U.S. Pat. No. 4,346,136, issued Aug. 24, 1982, to J. H. Lupinski, for BONDABLE MAGNET WIRE COMPRISING POLYAMIDE-IMIDE COATING CONTAINING RESIDUAL SOLVENT; and polyurethanes as disclosed in U.S. Pat. No. 2,916,403, issued Dec. 8, 1959 to G. C. Calderwood, for BONDING COMPOSITIONS; as well as a wide variety of other bondable resins.

Polyesterimide resin insulated wire enamels are well-known and widely used in the art of forming magnet wire for high temperature and hermetic applications. Compositions and methods for forming polyesterimide insulated wire enamels are well-known, and the application thereof to wire to form magnet wire is conventional and well-known to those of ordinary skill in the art. See, for example, British Pat. No. 973,377, British Pat. No. 996,649, U.S. Pat. No. 3,426,098, and U.S. Pat. No. 4,145,334.

Polyester resin insulated wire enamels are also known and widely utilized. One particularly successful polyester magnet wire insulation resin is manufactured by the General Electric Company under the Trademark ALKANEX, and is disclosed in U.S. Pat. No. 2,936,296, issued May 10, 1960, to F. M. Precopio, et al., for POLYESTER FROM TEREPHTHALIC ACID, ETHYLENE GLYCOL, AND A HIGHER POLYFUNCTIONAL ALCOHOL.

Polyamide-imide resin insulated wire enamels are known and widely used in the art of producing magnet wire. See, for example, U.S. Pat. No. 3,428,486, issued Feb. 18, 1969, to N. J. George, for POLYAMIDE-IMIDE ELECTRICAL INSULATION; U.S. Pat. No. 3,475,212, issued Oct. 28, 1969, to H. J. Back, for METAL CONDUCTOR COATED WITH NONLINEAR COPOLYESTER BASECOAT LAYER AND POLYAMIDE-IMIDE OUTER LAYER; U.S. Pat. No. 3,528,852, issued Sept. 15, 1970, to E. H. Olson, et al., for DUAL-COATED ELECTRICAL CONDUCTOR; and U.S. Pat. No. 3,695,929, issued Oct. 3, 1972, to F. A. Sattler, for CONDUCTORS INSULATED WITH A POLYMERIC AMIDE-IMIDE-ESTER AND AN AROMATIC POLYIMIDE OR AROMATIC POLYAMIDE-IMIDE OVERCOAT. In the commercial preparation of magnet wire, insulation coatings are conventionally applied to strands of wire in a wire tower such as disclosed in U.S. Pat. No. 3,183,604, issued May 18, 1965, to J. D. Stauffer for APPARATUS AND PROCESS FOR REMOVING SOLVENTS FROM COATINGS ON METAL, or U.S. Pat. No. 3,183,605, issued May 18, 1965, to D. D. Argue, et al., for APPARATUS FOR COATING METALS. In the wire tower, the wire to be coated is passed through an enamel applicator and receives a coating of resin and solvent in liquid form. The wire then passes through a vertical oven or furnace in which the solvent is removed and the coating cured on the wire. Multiple passes can be provided to increase the coating thickness. As pointed out in the above wire tower patents, care must be taken in the application and cure of the enamel coating to prevent the formation of blisters and other imperfections in the enamel coating.

Certain known self-bonding varnishes or coatings for various members, such as laminae and magnet wires, have many desirable characteristics and properties; however, the self-fusing or bonding in certain cases is believed to require excessively high temperatures or an excessive amount of time, and many of the self-bonding overcoats are believed to be unable to withstand many of the common environmental tests including chemical resistance toward various refrigerants, such as fluorinated hydrocarbons. Furthermore, many such self-bonding overcoats are applied from solutions containing hazardous solvents, and it is desirable to apply such resins and/or varnishes from media and/or carriers which are non-hazardous, for example, from water-based compositions.

OBJECTS OF THE INVENTION

It is the primary object of this invention to provide an improved self-bonding, electrically conductive material such as magnet wire.

Another object of the present invention is to provide a magnet wire or lamina overcoat which, when applied to a substrate, can be cured to a "B-stage" bondable state, and when so cured, the article may be subjected to handling, shipping, storage, and use in the usual commercial manner, followed by heating to provide a secure bond.

Another and more specific object of the invention is to provide a self-bondable, electrically insulated magnet wire which has excellent adhesive or bonding strength between wire strands or turns, which can be wound into coils on high speed winding machines, which has the ability to self-fuse in a short period of time up to a maximum temperature of about 250° C., which retains the desired bond strength at temperatures up to 250° C. according to standard helical coil test procedures; and which withstands environmental tests specific for the intended use.

Other objects and advantages of the invention will become apparent from the following description.

SUMMARY OF THE INVENTION

In accordance with the various forms of the present invention, it has been found that heat curable acrylic polymers, coated and partially-cured upon an electrically conductive substrate having an electrically insulating, heat-resistant cured resin coated thereon, can be stored, shipped and used in a conventional commercial manner. Such acrylic polymers, when coated on an electrically conducted substrate, can be partially cured to a flexible, scrape-resistant, bondable "B-stage". Such bondable products can then be assembled into suitable configurations, for example, magnet wire coils, which can be subsequently bonded by heating for short times at between about 200° C. and 250° C. The thermally bonding windings or other substrates retain their bond strength at temperatures up to about 250° C. The bonded structures do not require the subsequent varnish treatment customarily used to seal such coil structures and laminated structures to provide the rigidity required for stator windings in motors and other uses. Furthermore, the acrylic polymers are chemically resistant to the fluorinated hydrocarbons commonly used in hermetic motors. The acrylic polymer resin coating compositions and varnishes can be used as water-based emulsions or can be used in solvent solutions, and are typically cured in a second stage curing to a thermoset state. The acrylic polymers can be placed as overcoats over various resin-coated substrates such as polyesterimide resin coated magnet wire, and can be partially-cured to a flexible, moderately tough "B-stage", and later cured, for example, in ten seconds at 230° C. to provide a secure bond which retains its strength at temperatures as high as 250° C.

BRIEF DESCRIPTION OF THE DRAWINGS

FIG. 2 is a fragmentary, isometric view of a length of magnet wire having a self-bondable coating thereon embodying the present invention;

FIG. 3 is a sectional view taken along line 3—3 in FIG. 2;

FIG. 4 is a partial isometric view of a stationary assembly for a dynamoelectric machine supporting a plurality of coils, each including a plurality of turns of the magnet wire with the self-bondable overcoat thereon of FIGS. 2 and 3;

FIG. 4a is a sectional view taken along line 4a—4a of FIG. 4, illustrating the bondable magnet wire turns of one of the coils, each wire turn including a bondable overcoat, prior to the bonding of the wire turns; and FIG. 4b is a sectional view similar to FIG. 4a, illustrating the bondable magnet wire turns bonded securely to each other.

DESCRIPTION OF THE PREFERRED EMBODIMENT

Figure 1:
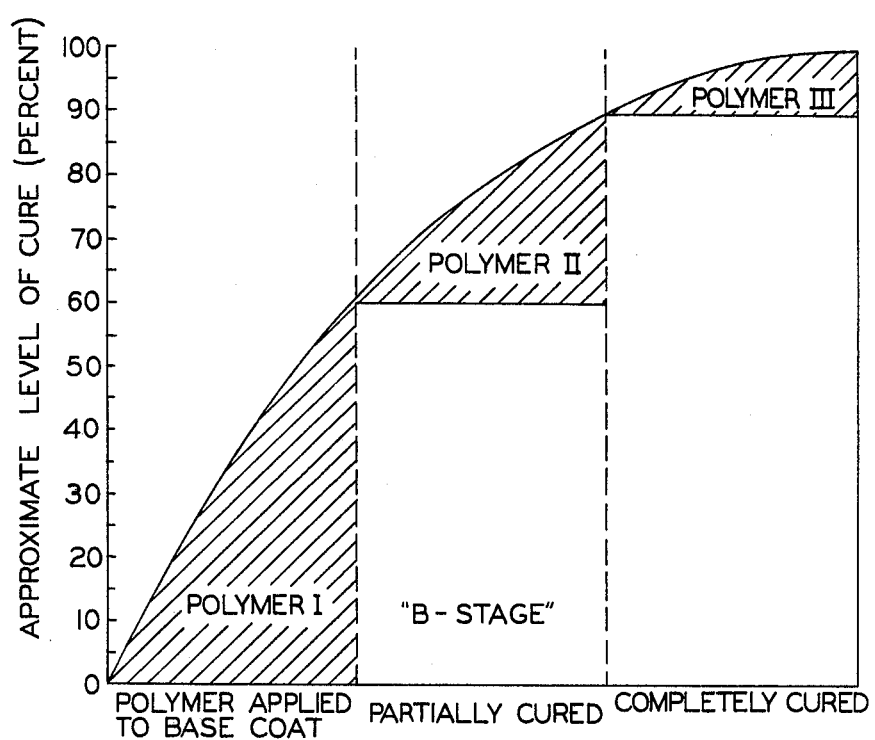
FIG. 1 is a diagramatic illustration of approximate levels or stages of cure in an acrylic polymer bondable overcoat composition embodied in the present invention.

In accordance with the present invention, a bondable electrically conductive material such as magnet wire comprises an electrically conductive element or substrate such as metal wire, a coating thereon comprising a base coat of electrically insulating, heat resistant, cured resin, and a bondable overcoat thereon of heat curable acrylic polymer partially cured to the B-stage upon the base coat. Each coating element can comprise one or a plurality of layers of the coating material.

The electrically conductive substrate is not critical. The electrical conductor may be any conventional electrically conductive material including, for example, copper, aluminum, iron, steel, silver and the like. Various electrically conductive metal alloys may also be utilized. The coating materials of the present invention may be used with a substrate of any shape, size or configuration. For example, insulated, heat-bondable metallic members embodying this invention may have as an electrically conductive base a metal or metallic substrate in the form of a core or base for magnetic devices, laminatable conducting plates, such as those in a motor, or wire such as used in forming magnet wire. The wire may be of any desired cross-section, or formed in strands.

The dual coatings, that is, the overcoat and base coat, of the present invention, the overcoat of which is a heat curable acrylic polymer, may be of any predetermined thickness. For example, a coating of about 1 to 2 mils may be utilized for fine magnet wires. The thickness of any particular coating is not critical as long as there is a sufficient coating to form a bond with another similarly-coated substrate.

The first coat, undercoat or base coat applied to the conductive substrate is an electrically insulating, heat resistant, fully cured resin. Preferred materials for the base coat include polyimides, polyamide-imides, polyesters, polyesterimides, polyesteramideimides and the like. Generally, the preferred high temperature base coat enamel or polymer is a polyesterimide enamel which is commercially available from numerous sources. After the base coat is applied to the metallic substrate, it is cured by conventional means, for example, by heating. The base coat may be applied to the substrate by a single application or by multiple applications, and it may be applied by a single technique or a combination of coating techniques. The thickness of the base coat may vary, depending upon the particular application, from as low as 0.1 mil up to about 15 mils or higher. However, the most preferred range for the thickness of the base coat is about 1.0 mil to up to about 4.0 mils. Generally, the base coating must be electrically insulating and heat-resistant in the vicinity of about 230° C. to about 250° C.

Applied as a heat bondable overcoat on the base coat of the insulated metallic substrate is a heat curable bondable acrylic polymer. This coating is provided by a partially cured B-stage acrylic polymer coating, which may be bonded to a like bondable coated substrate by heating in a second stage cure. In accordance with the present invention, in its preferred form, a coating of a heat curable acrylic polymer partially cured to a B-stage upon the cured resin base coat is provided on a previously insulated, electrically conducted substrate. This coating is partially cured to a bondable state or "B-stage" in order to provide a self-bondable wire. As used herein, heat curable acrylic polymer means that the acrylic polymer deposited upon the base coat and partially cured in a first stage cure can be further or additionally cured in a second stage cure by means of heat to form a bond with adjacent heat curable acrylic polymers.

Acrylic polymers useful in this invention are those which can be partially cured in a first stage and additionally fully cured in a second stage. Such heat-curable acrylic polymer compositions include acrylonitrile and/or methacrylonitrile; alkyl acrylates wherein the alkyl radical has from about 1 to about 12 carbon atoms; methacrylic acid or acrylic acid; and alkoxymethylacrylamides wherein the alkoxy group has about 1 to about 6 carbon atoms. The acrylic polymer composition may be utilized alone or in combination with a phenol formaldehyde condensate. The bondable acrylic compositions are preferably applied from an aqueous based coating composition, the solids content of which is adjusted according to the application technique as may easily be determined by one skilled in the art. For example, the solids content is adjusted from about 25% to about 40% by weight if roller coating is used, from about 20% to about 35% by weight if a die is used to apply the composition, and the like, as disclosed in U.S. Pat. No. 4,159,364.

Commercially available water-based emulsions of acrylic polymers are available from E. I. Dupont de Nemours and Co., under the trademark CAVALITE, and it is believed that these materials are more fully disclosed in U.S. Pat. No. 4,159,364. Other aqueous emulsions of acrylic-based polymers are commercially available from E. I. Dupont de Nemurs and Co., under the trademark, LECTON, and it is believed that these materials are more fully disclosed in U.S. Pat. No. 2,787,603. The foregoing acrylic polymer coating compositions ae merely exemplary and other classes and types of partially-cured, heat curable acrylic polymers suitable for coating upon the base coat to form a heat bondable acrylic polymer coating can be provided by one skilled in the art.

While the acrylic polymers are preferably applied from aqueous emulsions, it is believed that other carriers and/or solvents can be used to apply the compositions to the substrates being coated within the scope of the invention to meet at least some of the objects thereof. For example, it is believed that the acrylic polymers can be coated upon the base coat from a solvent solution with subsequent evaporation of the solvent and by other conventional and standard diluents, carriers, and solvent application techniques. Generally, water emulsions of acrylic polymer coating compositions are preferred because they eliminate the environmental problems which inherently accompany the use of solvent application techniques.

The first stage curing of the acrylic polymer upon the base coat covered substrate can be accomplished generally by lowering the curing temperature of the acrylic polymer during application of the polymer to the base coated material. For example, this can be accomplished by lowering the curing temperatures in the applicator, such as a wire tower in the case of the coating of wire, to provide an under-cured or "B-stage" polymer coating. In this stage the polymer is cured to a state where the acrylic polymer is fully set, non-tacky, stable, flexible and scrape-resistant, but not fully polymerized. The curing temperature varies with the speed of the wire in the tower, the volatility of the solvent and the particular type of tower used. It has been found, however, that the B-stage cure is generally reached with acrylic-based polymers by lowering the temperature typically used in the tower for fully curing the polymers to about 100° C. to about 150° C. The optimum tower temperatures for the first stage partial curing can be easily determined by one skilled in the art without undue experimentation from the teachings set forth herein.

Generally, the acrylic polymer coating compositions are partially cured in the first stage cure upon the base coat at about 150° C. to about 200° C. for relatively short periods of time, for example, from about 0.5 seconds to about 2 minutes. The second stage or final stage curing of the partially-cured acrylic polymers of the present invention, wherein the surfaces having the partially-cured acrylic polymer coatings thereon are fused, joined or bonded, is carried out at about 200° C. to about 250° C., and more preferably at about 200° C. to about 230° C., for somewhat longer periods of time, for example, for about 10 seconds to about 120 minutes.

Referring to FIG. 1, there is illustrated diagramatically successive stages of polymer cure of the acrylic polymers in the production of coated substrates embodying the present invention. In this diagramatic illustration, the approximate relative level of cure, ranging from uncured to totally cured, of the acrylic polymer is plotted against the cure stage. Initially, the polymers are applied to a base coated substrate in a state shown as the "POLYMER I" stage. It is this stage at which the polymer is applied to the base coat resin, for example, from an aqueous coating medium. The polymer in the "POLYMER I" stage is heated to a temperature less than the temperature normally required to cure the polymer fully, for a period of time sufficient to form a "B-stage" or partially-cured stage shown as the "POLYMER II" stage. This stage represents a partially-cured acrylic polymer, and it is the stage which provides a flexible, non-degradable, non-tacky, scrape-resistant and stable bondable overcoat which is easily handled and may be stored without adhering to other adjacent substrates coated with the same acrylic polymer and cured to a like stage or state. When the partially-cured bondable acrylic polymer-coated substrate is assembled into a desired configuration, for example, stator windings for a motor, the partially-cured acrylic polymer is then heated to from a temperature and for a period of time sufficient to complete the cure to form the fully cured polymer, in the "POLYMER III" stage as shown in FIG. 1. It is this last stage wherein the acrylic polymer becomes completely or substantially completely cured and self-bonds to adjacent layers coated with the same or similar polymer.

Any conventional coating technique, such as dipping, spraying, padding, die coating, electrocoating, roller coating and the like, may be utilized to apply the coating of the present invention. When wires are coated in accordance with the present invention, for example, the coating of the wire can be readily carried out in conventional wire coating towers by a multi-staged application wherein one or more coats of the base coat material are applied to the wire, and the base coat material is cured by heat, and thereafter, the cured resin base coat is overcoated with the acrylic polymer compositions of the present invention and partially cured in the wire coating tower.

Bondable magnet wire may be produced by applying an electrical grade enamel undercoat resin, such as a polyesterimide base coat, to the wire in approximately four passes or coatings in a conventional wire tower. This base coat of polyesteramide resin is completely cured. An acrylic polymer is next applied to the resin-coated wire and partially-cured thereon, that is, cured to the bondable or "B-stage" state. In certain preferred embodiments, it is desirable that the base coat comprise approximately two-thirds of the thickness of the total polymer coatings upon the wire.

As shown in FIGS. 2 and 3, a coated conductor 10 comprising a base wire 11 of a metal such as copper or aluminum or alloys thereof, having a base coat 12 of electrically insulating, heat resistant, cured resin such as, for example, polyimide, polyamideimide, polyester, polyesterimide, and polyesteramideimide, is provided with a bondable acrylic polymer overcoat 14. The resinous coating 12 may be conventionally applied to wire 11 by any conventional technique, for example, such as those described above. The acrylic polymer composition 14 is then applied by any suitable means to the base coated substrate. After the partial curing, it will be found that the acrylic polymer coating 14 is tenaciously adhered to base coat resin 12, and is flexible, stable, scrape-resistant, and non-tacky so that the overcoated material can be easily handled and assembled into a desired form, such as a coil or stator winding.

It is believed that the coatings 11 and 12 may have dispersed therein, suitable fillers, such as finely divided mica, silica, iron oxide, particles or fibers of glass and/or boron, coloring materials, and the like.

In FIG. 4, there is shown a plurality of coils 15 formed from bondable magnet wire 10, as described in FIGS. 1 and 2, wound, placed or otherwise supported in a suitable fashion upon a ferromagnetic core 16, such as a stationary assembly for a dynamoelecyric machine or device for instance, with each of the coils comprising a plurality of turns 17 of the wire. The acrylic polymer overcoat 14 which is partially cured upon the surface of magnet wire 10, is in contact with a like coating upon adjacent magnet wire turns 17.

At the stage illustrated in FIG. 4a, the partially cured acrylic polymer coating 14 in each turn 17 of wire 10 in coils 15 has not united, joined with, interacted with or otherwise bonded or fused with the coating on adjacent ones of the magnet wire turns. Referring to FIG. 4b, there is illustrated the article of FIG. 4a, but wherein the coated magnet wire turns 17 have been heat bonded together. The bondable acrylic polymer overcoat 14 has become a substantially continuous mass of acrylic polymer which joins and securely bonds together a plurality of at least some sections of magnet wire 11 in turns 17 of coils 15. In some instances, small air spaces or voids 19 may appear dispersed throughout the aforementioned bonded mass of acrylic polymer.

The base coated wire or other electrically conductive substrate having the heat curable acrylic polymer bondable coating thereon can be stored without seizing or bonding of the coating to surfaces so long as the coated materials are maintained at a temperature less than the second stage curing temperature required to cure additionally the partially-cured acrylic polymer, that is at temperatures generally below about 200° C. In such cases, the partially-cured acrylic polymer-coated substrates are dry to the touch, non-tacky and do not stick together. The scrape resistance or repeated scrape abrasion characteristics of the bondable, heat-curable acrylic polymer, partially cured upon the base coat in accordance with the present invention, as herein described, is between about 25 and 50 strokes as determined by utilizing a 700 gram weight, in the NEMA Test MW 24-25, wherein the scrape resistance of the fully cured acrylic polymer using a 700 gram weight, is between about 70 and 100 strokes.

Following winding or to placement on core 16, in the case of wires, such as magnet wire 10, or following assembly of plates or other shaped elements and substrates, the adjacent elements, for example, coil turns 17, can be readily bonded to each other by the application of heat. Heat can be applied externally, for example, by placing the substrates in an oven, or by applying radiated heat from a source such as an infra-red lamp, and the like. Alternatively, heat can be applied internally by means of a current passed through the element, that is, resistance heating, resulting in an increase in the temperature of the substrate itself. The resistance heating technique is particularly useful in the bonding of motor windings, such as coils 15 for instance, transformer coils and the like. During the bonding process, when the partially cured acrylic polymer is fully cured, it is believed that the cross-linking of the polymer becomes completed, and/or the completion of condensation reactions takes place, and/or functional groups react as water, or solvent is driven off, and/or any other curing mechanism becomes final, complete or substantially complete during the second stage application of heat to form a heat cured acrylic polymer.

A plurality of turns 17 of magnet wire 10 assembled in a particular configuration, such as illustrated by coils 15 for instance, and having partially cured acrylic polymer overcoat surfaces 14 in contact with each other, may be pressed or otherwise held together during the bonding, that is, the completion or substantial completion of the cure of the partially cured acrylic polymer overcoat. Thus, coils 15 or windings formed from the bondable magnet wire 10 herein described, may be pressed and bonded substantially simultaneously, utilizing, for example, resistance heating of the bondable coating 14 together with a surge of electrical energy in the coils in order to press the coil turns 17 together into slots 21 of stator or core 16, as disclosed in U.S. Pat. No. 3,456,338, incorporated herein by reference. When the bonding temperature is reached, a surge of electrical energy may be applied to or pulsed through the coils 15 which presses the coil turns 17 tightly together while overcoat 14, that is, the partially cured acrylic polymer overcoat, is in a bondable or self-bonding state. The coils 15 are immediately cooled by suitable means, such as by subjecting them to an air blast or other coolant or the like for instance, in order to set or harden the coils. Upon the elimination of the electrical surge, the coil turns 17 remain tightly bonded together. Further heat treatment of the coil or other substrate to complete the bonding may be appropriate, such as heating in an oven in addition to the resistance heating discussed above. When the magnet wire 10 is formed into coils 15 and a plurality of insulated, heat-bondable turns or sections thereof are at least in part in contact with each other, approximately five seconds of resistance heating is required to reach the bonding temperature of about 200° C. or higher, followed by about a 5 to about a 25 second hold at the bonding temperature.

The following examples are illustrative of the present invention, and are intended for illustration only and should not be construed as a limitation on the spirit and scope of the invention as expressed in the appended claims.

EXAMPLE 1

Aqueous acrylic polymer formulations having a 30% polymer solids content and supplied commercially by E. I. Dupont de Nemours and Co., under the trade designation CAVALITE 6351 were continuously coated upon polyesterimide-coated copper wire. Coated wire specimens were produced using three different coating tower speeds, namely, 10 feet per minute (3.04 m./min.) at 150° C., 7 feet per minute (2.13 m./min.) at 150° C. plus an additional 30 minutes at 170° C. and 7 feet per minute at 170° C., in a six foot high tower. Lap joint tests were conducted at various temperatures upon samples of the coated wire pressed and fused together and cured at about 230° C., (1.27 cm.) segments.

The lap joint test is conducted by overlapping two pieces of the coated wire, the length of the overlap being about 0.5 inches (1.27 cm.) in a jig. The two wires are bonded together by heating at a temperature sufficient to complete or substantially complete the curing of the acrylic polymer, and the fused wires are cooled and removed from the jig. They are then tested by connecting nonoverlapped ends to an Instron tester, and the amount of weight of pull the fused wires apart is determined thereon. Generally, a lap test greater than about 1 pound (0.45 Kg.) to about 2 pounds (0.90 Kg.) for a wire sample heated at about 250° C. is considered adequate for bond strength in accordance with the lap test.

Illustrative lap joint test results are set forth in Table I below:

TABLE 1
LAP JOINT TESTS AT VARIOUS TEMPERATURES OF 0.5" SEGMENTS OF CURED ACRYLIC POLYMER-COATED WIRES HAVING A BASE COAT OF CURED POLYESTER IMIDE

| TEMPERATURE IN °C. OF LAP JOINT TEST | STRENGTH OF BOND (lbs. to break) | WIRE COATING SPEED IN COATING TOWER |
| --- | --- | --- |
| 210 | 4.0 | 7 ft/min |
| 210 | 5.0 | 10 ft/min |
| 230 | 4.8 | 10 ft/min |
| 230 | 5.0 | 10 ft/min |
| 235 | 4.8 | 7 ft/min + 30 min @ 170° C. |
| 240 | 3.0 | 7 ft/min |
| 250 | 4.8 | 7 ft/min + 30 min @ 170° C. |
| 265 | 4.0 | 10 ft/min |
| 267 | 3.0 | 10 ft/min |

EXAMPLE 2

Wire having a polyesterimide-coating thereon, as well as a commercially-applied lubricant, was dip-coated in an aqueous coating of acrylic polymer commercially supplied by E. I. Dupont de Nemours and Co., under the trademark CAVALITE RK-6350. The water emulsion acrylic polymer had a polymer solids content of 42%. The dip-coating of the acrylic polymer resulted in a one mil overcoat in a single coating application. After about one-half hour of heating at 95° C., the partially-cured acrylic top coat or overcoat could be scratched off the polyesterimide-coated wire with a fingernail. After an additional 5 minutes of heating at 125° C., it was observed that the partially-cured acrylic polymer overcoat would not scratch off the wire when scratched with the fingernail, and the wire could be wound on its own diameter without cracking.

Additional coated wires were prepared in accordance with the foregoing procedure with the same cure, that is, one-half hour at 95° C., plus 5 minutes at 125° C., and were wound into 6-turn spring coils on a ¼ inch diameter mandrel. The 6-turn spring coils were extended and then compressed with an alligator clip, and heated for 5 minutes at 200° C. A suitable bond between the acrylic polymer overcoated wire turns was obtained.

A spring coil was heated in compression for 5 minutes at 175° C. and was observed to be well-bonded. The bonded coil was placed in an oven at 250° C. for 5 minutes. After 5 minutes at 250° C., the bondable coating kept the spring from opening and returning to its original length.

Bond tests and lap joint tests of the foregoing coated wires are shown in Table II below.

TABLE 2
BOND AND LAP JOINT TESTS OF ACRYLIC POLYMER (42% SOLIDS CONTENT) COATED ON POLYESTERIMIDE-COATED COPPER WIRE

| | BOND TESTS | | | |
| --- | --- | --- | --- | --- |
| NO. OF COATS OF ACRYLIC POLYMER | PARTIAL CURE (EACH COAT) | FINAL CURE OF CLIPPED WIRE COILS | SELF-BOND FORMATION | BOND TEST (5 min.-250° C.) |
| 2 | 1 min-150° C. | 5 mins-230° C. | YES | OK |
| 2 | 1 min-150° C. | 5 mins-230° C. | YES | Partial |
| 2 | 2 min-150° C. | 1 min-230° C. | NO | (Cause of lack of bond unknown) |
| 2 | 2 min-150° C. | 5 mins-230° C. | YES | Partial |

| | LAP JOINT TESTS | | |
| --- | --- | --- | --- |
| CURE | BOND LENGTH (inches) | TEST TEMPERATURE (°C.) | FORCE TO BREAK BOND (POUNDS) |
| 5 min. @ 125° C. | 0.49 | 239° | 6.5 |
| 5 min. @ 125° C. | 0.55 | 234° | 5.8 |
| 5 min. @ 125° C. | 0.47 | 240° | 9.5 |
| 5 min. @ 125° C. + 30 min. @ 170° C. | 0.45 | 275° | 4.5 |
| 5 min. @ 125° C. + 30 min. @ 170° C. | 0.47 | 222° | 6.5 |

EXAMPLE 3

Polyesterimide-coated magnet wire was coated in a wire tower with bondable acrylic polymer enamel commercially available from E. I. Dupont de Nemours and Co., under the trademark CAVALITE 6350 (Polymer D). The acrylic polymer was an aqueous emulsion having a 42% solids content and 3% by weight isopropanol. The wire was passed through the wire tower at three different speeds as recorded in Table 3 below. The bottom of the tower was maintained at a temperature of 85° C. and the top of the tower at a temperature of 175° C. An overcoat of 1.0 mil of acrylic polymer was coated upon the polyesterimide-coated magnet wire. In each case, two passes were made in a six foot vertical tower having a die sequence of 45 mils and 46 mils. The base coat or polyesterimide coat was a fully cured 2-mil build on 40.3 mil copper. Flexibility tests were carried out on each sample with 25% elongation followed by winding on a mandrel of 1×40.3 mils (the diameter of the copper wire), 3×40.3 mils (the diameter of the copper wire), and 5×40.3 mils (the diameter of the copper wire). Under these conditions, the most severe test was the test conducted at 1×40.3 mils. The results of the tests are shown in Table 3 below:

TABLE 3
FLEXIBILITY TESTS OF POLYESTERIMIDE-COATED MAGNET WIRE OVERCOATED WITH ACRYLIC POLYMER HAVING 42% SOLIDS CONTENT AND 3% ISOPROPANOL

| WIRE SPEED (ft/minute) | TOWER TEMP. Bottom/Top | OVERCOAT BUILD OF POLYMER (MILS) | FLEXIBILITY (25%) | | |
|---|---|---|---|---|---|
| | | | 1X | 3X | 5X |
| 10 | 85°/175° C. | 1.0 | OK | OK | OK |
| 15 | 85°/175° C. | 1.0 | OK | OK | OK |
| 5 | 85°/175° C. | 1.0 | 1 crack | OK | OK |

EXAMPLE 4

Three different polymer compositions, designated A, B and C, were coated upon polyesterimide-coated magnet wires at various wire speeds in a 6 foot (1.82 m.) vertical tower. Two passes were made for each coating in the 6 ft. (1.82 m.) vertical tower, and a die sequence of 45 mils and 46 mils was used. The base coat of the fully cured polyesterimide coat or enamel was a 2 mil build on a 40.3 mil copper wire.

Polymer A is an acrylic polymer commercially available from E. I. Dupont de Nemours and Co. under the trademark CAVALITE 6371T as an aqueous emulsion having a 30% solids content and a viscosity of 2000 centipoise.

Polymer B is an acrylic polymer commercially available from E. I. Dupont de Nemours and Co. under the trademark CAVALITE 6351 as an aqueous emulsion having a solids content of 30% and a viscosity of 2000 centipoise.

Polymer C is a solderable acrylic polymer available commercially from E. I. Dupont de Nemours and Co., under the trademark CAVALITE 6335 as an aqueous emulsion having a viscosity of 2300 centipoise.

The flexibility of the wires coated at various wire speeds in the wire coating tower is shown in Table 4 below. In each case, two passes were made in a 6 ft. (1.82 m.) vertical tower having an inverted die sequence of 45 mils and 46 mils. The polyesterimide magnet wire base coat was fully cured polyesterimide enamel having a 2 mil build on a 40.3 mil copper wire. The flexibility tests were 25% elongation followed by winding on a mandrel of a diameter 1x, 3x, and 5x the diameter of the wire.

TABLE 4
FLEXIBILITY TESTS OF POLYESTERIMIDE-COATED COPPER WIRES OVERCOATED WITH VARIOUS ACRYLIC POLYMERS HAVING VARIOUS POLYMER SOLIDS CONTENTS

| ACRYLIC POLYMER | WIRE SPEED (ft/min.) | TOWER TEMP. bottom/top (°C.) | BUILD OF OVERCOAT (Mils) | FLEXIBILITY | | |
|---|---|---|---|---|---|---|
| | | | | 1X | 3X | 5X |
| POLYMER A | 10 | 80/185 | 0.5 | OK | OK | OK |
| POLYMER A | 6.5 | 80/185 | 0.8 | OK | OK | OK |
| POLYMER A | 15 | 80/185 | 0.8 | Too Tacky Undercured | | |
| POLYMER A | 4 | 80/185 | 0.8 | OK | OK | OK |
| POLYMER B | 4 | 80/185 | 1.0 | *OK | *OK | *OK |
| POLYMER B | 7 | 80/185 | 1.0 | *OK | *OK | *OK |
| POLYMER B | 10 | 80/185 | 1.0 | *OK | *OK | *OK |
| POLYMER C | 10 | 80/185 | 1.0 | Cracks on elongation | | |
| POLYMER C | 7 | 80/185 | 1.0 | Cracks | | |
| POLYMER C | 15 | 80/185 | 1.0 | Cracks and powders | | |

*Tests also made after two weeks of storage at room temperature.

Generally, the acrylic polymer overcoats in Table 4 above passed the flexibility test and could be wound on the various mandrels without cracking, and the partially cured overcoat was suitable for handling and winding. In one case, the sample was too tacky, indicative of an undercure. Polymer C cracked upon elongation and also formed various other cracks and powdered, believed to be due to an excess of cross-linking agent in the polymer composition resulting in a brittle polymer. Table 4 shows that the acrylic polymer overcoats can be partially cured to a flexible "B-stage" which is suitable for handling and further assembly prior to self-curing, bonding or fusing of the acrylic polymer overcoat.

The 25% elongation flexibility test is described at column 5, line 60 of U.S. Pat. No. 4,159,364. In the flexibility test, the coated wire is stretched 25% and is wrapped around itself 10 turns and the coating is examined for breaks. If there are no breaks, the rating is 1 x. If a break in the coating occurs, the wire is wrapped around larger mandrels until there are no breaks in the coating. For example, a rating of 3 x means that the wire can be wrapped around a mandrel that is 3 x the diameter of the wire without breaking the coating.

EXAMPLE 5

Lap joint tests were made upon the wire samples described in Example 4 above. The lap joint tests were made upon various lengths of wires shown in Table 5 below, and the lap joints were fused for 1.25 minutes at 150° C. to 230° C., as shown in the table, under a 218 gram weight. The weight required to break the bond is shown in Table 5 below for the various bondable wires at the test temperatures shown.

TABLE 5
LAP JOINT TESTS ON ACRYLIC POLYMER-COATED BONDABLE WIRES

| WIRE SAMPLE (from Table 4) | WIRE SPEED (ft/min.) | BOND LENGTH (inches) | TEST TEMP. (°C.) | FORCE TO BREAK BOND (POUNDS) | BOND WIDTH (mils) |
|---|---|---|---|---|---|
| POLYMER A | 10 | 0.67(1.70cm) | 244 | 4.0 | — |
| POLYMER A | 10 | 0.61(1.55cm) | 248 | 4.5 | — |

TABLE 5-continued

LAP JOINT TESTS ON ACRYLIC POLYMER-COATED BONDABLE WIRES

| WIRE SAMPLE (from Table 4) | WIRE SPEED (ft/min.) | BOND LENGTH (inches) | TEST TEMP. (°C.) | FORCE TO BREAK BOND (POUNDS) | BOND WIDTH (mils) |
|---|---|---|---|---|---|
| POLYMER A | 10 | 0.47(1.19cm) | 232 | 4.5 | — |
| POLYMER A | 10 | 0.45(1.14cm) | 250 | 3.5 | 15 |
| POLYMER A | 10 | 0.51(1.30cm) | 271 | 3.5 | 15 |
| POLYMER B | 4 | 0.40(1.02cm) | 246 | 1.75 | 7–8 |
| POLYMER B | 4 | 0.50(1.27cm) | 218 | 1.75 | 6–8 |
| POLYMER B | 4 | 0.50(1.27cm) | 245 | 1.0 | 6–7 |
| POLYMER B | 7 | 0.53(1.35cm) | 208 | 4.0 | 14–15 |
| POLYMER B | 7 | 0.52(1.32cm) | 240 | 2.5 | 13 |
| *POLYMER B | 7 | 0.50(1.27cm) | 249 | 3.75 | 14 |
| *POLYMER B | 7 | 0.52(1.32cm) | 235 | 3.75 | 13 |
| POLYMER B | 10 | 0.53(1.35cm) | 230 | 4.75 | — |
| POLYMER B | 10 | 0.54(1.37cm) | 230 | 4.25 | — |
| POLYMER B | 10 | 0.51(1.30cm) | 267 | 2.5 | 12 |
| POLYMER B | 10 | 0.51(1.30cm) | 264 | 3.25 | 13 |
| POLYMER B | 10 | 0.51(1.30cm) | 209 | 5.0 | 13 |
| POLYMER D | 5 | 0.45(1.14cm) | 214 | 2.5 | 7–12 |
| POLYMER D | 5 | 0.48(1.22cm) | 261 | 1.5 | 6–10 |
| POLYMER D | 5 | 0.53(1.35cm) | 271 | 1.75 | 3–12 |

*Post cure for 30 minutes at 170° C.

EXAMPLE 6

Self-bonding tests were conducted on Polymer A, Polymer B and Polymer C of Example 4. Wires coated as shown in Example 4 above were formed into a spring coil and heated for 5 minutes at 230° C. The spring coil was held together by an alligator clip to provide sufficient pressure to the wires in the coil to effect contact between the wires during the bonding and heat curing step. The bonded coils were further heat tested at a temperature of 250° C. for 5 minutes. The results of the tests are shown in Table 6.

TABLE 6

SELF-BONDING TESTS ON POLYACRYLATE B-STAGE CURED ON POLYESTERIMIDE-COATED WIRE

| SAMPLE | WIRE SPEED (ft./min.) | SPRING COIL TEST | HEAT TEST 5 mins- 250° C. LOOSE | BOND WIDTH (mils) |
|---|---|---|---|---|
| POLYMER A | 10 | Bonds | 4/5 | 12–15 |
| POLYMER A | 6.5 | Bonds | 3/5 | 15 |
| POLYMER A | 15 | Too Tacky | — | — |
| POLYMER A | 4 | Bonds | Open | 9 |
| POLYMER B | 4 | Bonds | 4/5 | 10–12 |
| POLYMER B | 7 | Bonds | Retains | 9–12 |
| POLYMER B | 10 | Bonds | Retains | 12–14 |
| POLYMER C | 10 | Cracks upon winding | — | — |
| POLYMER C | 7 | Bonds | Retains | 12–15 |
| POLYMER C | 15 | — | — | — |

EXAMPLE 7

Wire samples having a coating of Polymer B as described above in Example 4 were produced in a wire tower wherein wire speeds were 4 feet per minute, 7 feet per minute and 10 feet per minute, the bottom temperature was 80° C. and the top temperature was 185° C. The wires were wound into helical coils. A one-pound weight was placed on the coils, and they were resistance heated for 5 seconds to reach 230° C. and held at that temperature for 10 seconds. The bond strength of the helical coils coated at the various speeds in the wire coating tower are reported in Table 7 below.

TABLE 7

BOND STRENGTH OF HELICAL COILS OF ACRYLIC POLYMER OVERCOATED WIRES

| POLYMER | WIRE SPEED (ft/min.) | BOND STRENGTH (in pounds) | | | |
|---|---|---|---|---|---|
| | | 180° C. | 200° C. | 230° C. | 250° C. |
| B | 4 | 1.11 | — | 1.12 | 0.78 |
| | | | | 1.12 | 1.00 |
| B | 7 | 2.07 | | 1.26 | 1.22 |
| | | | | 1.45 | 1.34 |
| B | 10 | 1.88 | 1.60 | 1.37 | 0.93 |
| | | | 1.57 | 1.27 | 1.00 |

The data in Table 7 show that the wire coated with the acrylic polymer at a speed of 7 ft. (2.13 m.) per minute results in helical coils having the greatest bond strength, the bond strength being at 1.22 pounds and 1.34 pounds at a temperature of 250° C. The helical coil test is a standard test, identified as ASTM D-2519-75.

EXAMPLE 8

Helical coils were made, in accordance with the procedure set forth in Example 7 above, from a polyamideimide-coated 0.0427 mil copper wire. The polyamideimide coated copper wire was coated with the acrylic polymer as described in Example 7 above and wound into three inch (7.52 cm.) coils. The coils were self-bonded by resistance heating to effect a heat rise in 5 seconds up to 230° C. and the temperature of 230° C. was held for ten seconds. The average bond strength was determined at various temperatures between 25° C. and 250° C. as reported in Table 8.

TABLE 8

BOND STRENGTH OF ACRYLIC POLYMER OVERCOATED HELICAL COILS AT VARIOUS TEMPERATURES

| COIL NO. | TEST TEMPERATURE (°C.) | BOND STRENGTH (Pounds) | | AVERAGE BOND STRENGTH (lbs.) |
|---|---|---|---|---|
| | | Test #1 | Test #2 | |
| 1 | 25° | 29 | 29 | 29 |
| 2 | 125° | 8.5 | 10.0 | 9.2 |
| 3 | 150° | 4.8 | 5.0 | 4.9 |
| 4 | 180° | 1.5 | 2.4 | 2.0 |
| 5 | 200° | 1.5 | 1.7 | 1.6 |
| 6 | 225° | 0.8 | 0.8 | 0.8 |
| 7 | 250° | 0.5 | 0.9 | 0.7 |

EXAMPLE 9

Wire having a cured polyesterimide coating thereon, was hand-dipped into an aqueous acrylic coating composition, identified as LECTON 6323, a product of E. I. Dupont de Nemours and Co. The LECTON acrylic resins are commercially available from E. I. Dupont de Nemours and Co., in various viscosities. The LECTON 6323 acrylic polymer coating was partially cured until it was dry to the touch. The coated wire sample had sufficient strength and integrity to be wound into a coil. Length of the acrylic polymer coated wire were bonded together under standard conditions, for example, for 10 seconds at 230° C. The bonded wires showed adequate bonding strength at 250° C.

EXAMPLE 10

LECTON RK 6322 acrylic-based varnish, supplied commercially by E. I. Dupont de Nemours and Co., was coated upon a polyesterimide-coated copper wire having a diameter of 0.0427 inches. The LECTON RK 6322 varnish was diluted with water so that it had a solids content of 20% polymer solids. The polyamideimide-coated copper wire was first wound into helical coils which were then cleaned in conventional fluids and dipped in the LECTON RK 6322 varnish at 20% solids, and then baked in an oven as set forth below. Samples were made by (1) applying one coat of the acrylic polymer varnish and (2) by applying two coats of the acrylic polymer varnish to the helical coils. The one coat technique, to form the partially cured acrylic polymer coating upon the wires wound in the helical coil was allowed to air dry for 30 minutes after dipping followed by heating at a temperature of 100° C. in an oven for 30 minutes and completed by heating in an oven at 160° C. for two hours. In the two coat system, the first coat was applied by dipping the helical coil in a reservoir of the acrylic polymer coating materials to apply a first coat of partially cured acrylic polymer upon the wires wound in the helical coils and permitting the dipped coil to air dry for 30 minutes followed by heating in an oven at 100° C. for thirty minutes. Thereafter, the helical coil was again dipped in the acrylic polymer varnish and partially cured for 30 minutes in the air followed by heating in an oven at 100° C. for for thirty minutes and subsequently heated at 160° C. for two hours. The bond strengths of the cured acrylic polymer coatings in the helical coils were tested by the helical coil test according to ASTM D-2519-75 and are reported in Table 9 below at various test temperatures ranging from room temperature up to 250° C.

TABLE 9

BOND TESTS OF HELICAL COILS DIPPED IN ACRYLIC POLYMER OVERCOAT COMPOSITION

| TEST NO. | TEST TEMP. (°C.) | BOND STRENGTH OF COIL IN LBS. BY ASTM-D-2159-75 | |
|---|---|---|---|
| | | ONE COAT | TWO COATS |
| 1 | Room Temperature | 17 | 25 |
| | | 15 | 29 |
| | | 19 | 44 |
| 2 | 180° C. | 3.4 | 3.5 |
| | | 4.1 | 5.2 |
| | | 4.2 | 4.4 |
| 3 | 200° C. | 2.0 | 2.8 |
| | | 2.2 | 2.8 |
| | | 2.3 | 3.2 |
| 4 | 225° C. | 1.7 | 1.7 |
| | | 2.2 | 1.7 |
| | | 1.8 | 1.7 |
| 5 | 250° C. | 1.4 | 1.8 |
| | | 1.1 | 1.1 |
| | | 1.5 | 1.4 |

While the present invention has been described in detail with particular reference to certain preferred embodiments thereof, it will be understood that variations and modifications can be effected within the spirit and scope of the invention as expressed in the appended claims.

What is claimed is:

1. An insulated heat bondable electrically conductive material comprising an electrically conductive substrate, a base coat on said substrate of electrically insulting, heat resistant, cured resin, and an overcoat of heat curable acrylic polymer upon said base coat forming a non-tacky, flexible, scrape resistant heat bondable acrylic polymer coating thereon.

2. The insulated heat bondable material as defined in claim 1 wherein said heat curable acrylic polymer is a partially curable acrylic polymer selected from the group consisting of polymers and copolymers of acrylic acid, methacrylic acid, esters of acrylic acid, esters of methacrylic acid, acrylonitrile, and (alkoxymethyl)acrylamide.

3. The insulated, heat bondable material as defined in claim 1 wherein the base coat of electrically insulating, heat resistant, cured resin is selected from the group consisting of polyimide, polyamideimide, polyesterimide, polyester, and polyesteramideimide polymers.

4. The insulated, heat bondable material as defined in claim 1 wherein said substrate is a metal selected from the group consisting of copper and aluminum.

5. The insulated, heat bondable material as defined in claim 4 wherein the electrical conductive material is a wire.

6. An insulated heat bondable magnet wire comprising a metal wire substrate, a base coat of electrically insulating, heat resistant, cured resin coated upon said metal wire substrate, and an overcoat of a non-tacky, flexible, scrape resistant heat curable acrylic polymer partially cured upon the base coat and self-bondable at a temperature between about 200° C. and about 250° C.

7. Magnet wire as defined in claim 6 wherein heat curable acrylic polymer is selected from the group consisting of polymers and copolymers of acrylic acid, methacrylic acid, esters of acrylic acid, esters of methacrylic acid, acrylonitrile and (alkoxymethyl)acrylamide.

8. A bondable enamel coated, insulated, electrical conductor comprising an electrical conductor, a base insulation coating on said conductor of cured, solid, thermosetting, resin enamel, and a non-tacky, flexible, scrape resistant bondable overcoat of solid, thermoplastic resin enamel on said base coating, characterized in that said solid, thermoplastic resin enamel comprises a B-stage acrylic polymer.

9. A bondable electrical conductor as defined in claim 8, wherein said base enamel and said bondable enamel are in a thickness ration of between about 1 to 1 to about 6 to 1 respectively.

10. A bondable electrical conductor as defined in claim 8, wherein said base enamel is a polyesterimide wire enamel.

11. A bondable electrical conductor as defined in claim 8, wherein said base enamel is selected from the group consisting of polyesterimide, polyamideimide, polyester, polyimide and polyesteramideimide wire enamels.

12. A bondable enamel coated, insulated, electrical conductor comprising, in combination, an electrical conductor, a base insulation coating on said conductor of cured polyesterimide enamel, and a non-tacky, flexible, scrape resistant bondable B-stage acrylic polymer insulation coating on said base coating.

13. A bondable electrical conductor as defined in claim 12 wherein said base coating and said overcoating are in a thickness ratio of about 2 to 1 respectively.

14. A bondable electrical conductor as defined in claim 12 wherein said base coat and said overcoat retain bonded strength up to about 200° C.

15. A bondable electrical conductor as defined in claim 12 wherein said conductor is bondable by resistance heating of the electrical conductor at a temperature of about 200° C. and about 275° C. in a period of less than approximately thirty seconds.

16. An article comprising a plurality of juxtaposed insulated, heat bondable metallic substrate sections, each metallic substrate section having a metal base, a base coat of electrically insulating, heat resistant, cured resin coated upon the metal base and an overcoat of a B-stage acrylic polymer upon the base coat to form a heat bondable polymer coating, the overcoat of one metallic substrate section being in contact with the overcoat of at least one other metallic substrate section.

17. The article of claim 16 further comprising a heat bonded metallic substrate section wherein the acrylic polymer is heated to bond the polymer overcoat of one metallic substrate section together with the polymer overcoat of the other metallic substrate section in contact therewith.

18. A dynamoelectric device including at least one magnet wire coil comprising a plurality of insulated, heat bondable metallic wire substrate turn sections, each metallic wire substrate turn section having a metal wire base, a base coat of electrically insulating, heat resistant, cured resin coated upon the metal wire base, and an overcoat of B-stage acrylic polymer upon the base coat to form a heat bondable polymer coating, at least a part of the polymer overcoat of one metallic wire substrate turn section being in contact with at least a part of the polymer overcoat of at least one adjacent metallic wire substrate turn section, and said coil having been heated to bond at least part of the polymer overcoat of the one metallic wire substrate turn section together with at least part of the polymer overcoat of at least one adjacent metallic wire substrate turn section in contact therewith to form a bonded coil.

19. A method of making an insulated, heat bondable metal substrate comprising:
applying a base coat of electrically insulating heat resistant resin to the metal substrate;
curing the base coat resin;
applying an overcoat of acrylic polymer forming composition upon the cured base coat resin; and
partially curing said acrylic polymer coating composition to the B-stage to form a heat bondable overcoat on said base coat resin coated substrate.

20. A method of self-bonding a plurality of turns of a magnet wire defining a coil thereof with the magnet wire having a base coat of an electrically insulated heat resistant resin and an overcoat of heat curable acrylic polymer, the method comprising the steps of:
adhering the base coat to the magnet wire and curing it thereon;
forming the overcoat upon the cured base coat on the magnet wire and partially curing the overcoat to a preselected cure stage less than a generally complete cure stage thereby to form a bondable overcoat;
assembling the turns of the magnet wire into the coil thereof with at least a part of the overcoat of at least one of the turns being in contact with at least a part of at least another of the turns; and
curing the overcoat on the magnet wire to the generally complete cure stage thereof and effecting thereby the bonding together of at least the at least part of the overcoat on the at least one turn of the magnet wire in contact with the at least part of the overcoat on the at least another turn of the magnet wire.

21. The method as set forth in claim 20 wherein the forming and partially curing step includes heating the overcoat to a preselected temperature to effect the partial curing to the preselected cure stage thereof less than the generally complete cure stage.

22. The method as set forth in claim 21 wherein the preselected temperature is in a range between about 125° C. and about 200° C.

23. The method as set forth in claim 20 wherein the curing and effecting step includes heating the coil to a preselected temperature to effect the cure of the overcoat to the generally complete cure stage thereof.

24. The method as set forth in claim 23 wherein the preselected temperature is within a range between about 200° C. and about 250° C.

25. The method as set forth in claim 23 comprising the additional step of cooling the coil.

26. The method as set forth in claim 25 wherein the bond between at least the at least part of the overcoat on the at least one turn of the magnet wire and the at least part of the overcoat on the at least another turn of the magnet wire effected upon the cooling of the coil has a strength of between about 30 pounds to about 60 pounds at a temperature between about 20° C. and about 30° C.

27. The method as set forth in claim 20 wherein the heat curable acrylic polymer is a water based emulsion.

28. The method as set forth in claim 20 wherein the heat curable acrylic polymer is a partially curable acrylic polymer selected from a group consisting of polymers and copolymers of acrylic acid, methacrylic acid, esters of acrylic acid, esters of methacrylic acid, acrylonitrile and (alkoxymethyl)acrylamide.

* * * * *

UNITED STATES PATENT AND TRADEMARK OFFICE
CERTIFICATE OF CORRECTION

PATENT NO. : 4,388,371
DATED : June 14, 1983
INVENTOR(S) : Donald A. Bolon and Edith M. Boldebuck (deceased)

It is certified that error appears in the above—identified patent and that said Letters Patent is hereby corrected as shown below:

Claim 1, lines 21-22, "insulting" should be --insulating--.

Signed and Sealed this

Eleventh Day of December 1984

[SEAL]

Attest:

GERALD J. MOSSINGHOFF

Attesting Officer   Commissioner of Patents and Trademarks